March 16, 1948. K. N. SWANSON 2,437,898
AUTO-FOCUS PHOTOGRAPHIC ENLARGER OF THE FOLDED-LIGHT-PATH TYPE
Filed Aug. 4, 1945 4 Sheets—Sheet 1

INVENTOR.
KEITH N. SWANSON
BY
ATTORNEY

March 16, 1948. K. N. SWANSON 2,437,898
AUTO-FOCUS PHOTOGRAPHIC ENLARGER OF THE FOLDED-LIGHT-PATH TYPE
Filed Aug. 4, 1945 4 Sheets-Sheet 3

INVENTOR.
KEITH N. SWANSON
BY
W. W. Beatty
ATTORNEY

March 16, 1948.    K. N. SWANSON    2,437,898
AUTO-FOCUS PHOTOGRAPHIC ENLARGER OF THE FOLDED-LIGHT-PATH TYPE
Filed Aug. 4, 1945    4 Sheets-Sheet 4
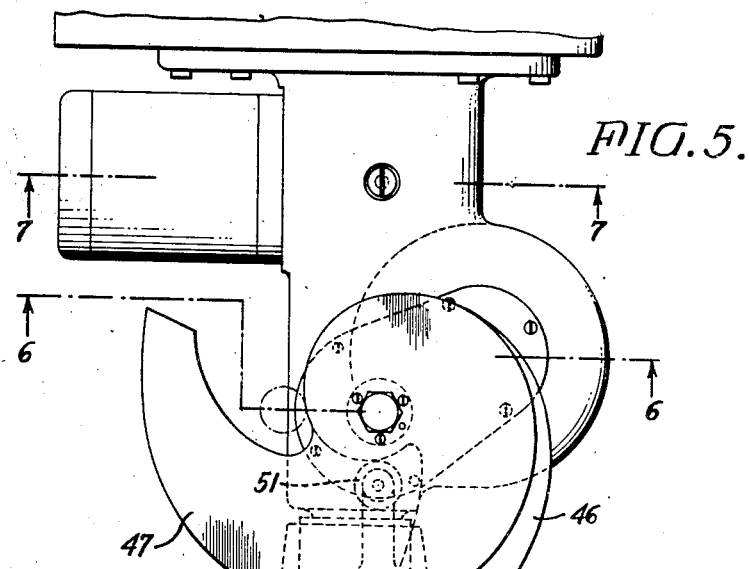
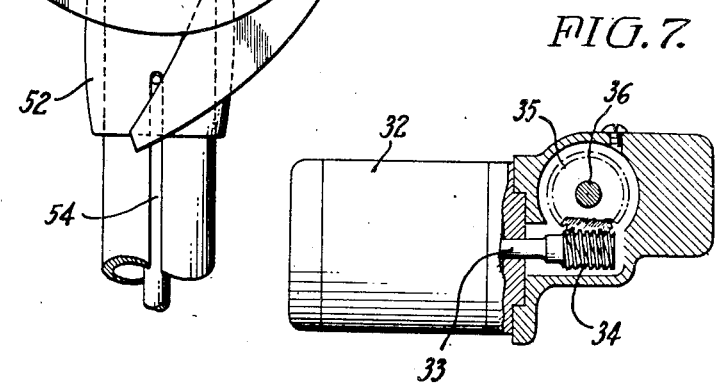
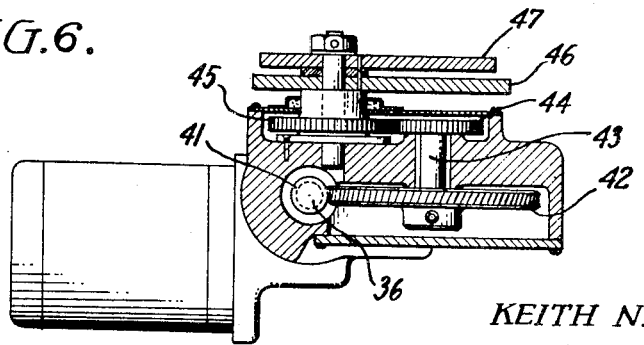
INVENTOR.
KEITH N. SWANSON
BY
*W. T. Beatty*
ATTORNEY Patented Mar. 16, 1948

2,437,898

UNITED STATES PATENT OFFICE 2,437,898

AUTOFOCUS PHOTOGRAPHIC ENLARGER OF THE FOLDED-LIGHT-PATH TYPE

Keith N. Swanson, Hollywood, Calif., assignor to Bell & Howell Company, Chicago, Ill., a corporation of Illinois Application August 4, 1945, Serial No. 608,937

8 Claims. (Cl. 88—24)

The invention relates to a photographic enlarger or projection printer for making photographic enlargements.

An object of the invention is to facilitate the adjustment for different ratios of enlargement.

In the ordinary case, the enlarger or projection printer has a straight line optical path with the result that for large enlargement ratios the apparatus requires a considerable amount of space, and with the further result that the master holder and the copy holder are separated far enough apart to require the operator to move from one position to the other. Also, the usual arrangement requires a separate manual adjustment of the various elements in the optical path.

Another object of the present invention is to provide a projection printer or enlarger wherein the master holder and copy holder are arranged adjacent each other at the same operator's position, with means under control of the operator at that position to vary the optical enlarging device for varying the enlargement, the control being so arranged that conjugate foci of the projection lens are maintained at the planes of the master and copy holders in all positions of adjustment. The advantage of this arrangement is that the operator may remain at one position and insert the film or plate in the master holder and while at that position may observe the enlargement in the copy holder as well as operate a control member to vary the enlargement to a desired amount. In the ordinary case a negative is inserted in the master holder whereby a positive is printed in the copy holder. However, a positive may be employed in the master holder for the purpose of making a duplicate negative.

Another object of the invention is to provide an enlarger of the type described which is compact and enclosed within a casing. This is accomplished by providing an optical path from the printing light source through the master holder and lens inwardly of the casing, with means for diverting the optical path in a direction toward the copy holder, means being provided under control of the controller for varying the focus of the lens as well as the adjustment of the optical diverter in such a manner as to maintain conjugate foci of the lens at the planes of the master and copy holders. That is the negative or the like in the master holder is maintained in focus at the copy holder.

Another object of the invention is to provide in conjunction with the means for maintaining conjugate foci of the lens at the planes of the master and copy holders in all enlargement adjustments, of means for maintaining the axis of the optical path portion between the diverting means and the copy holder fixed at the plane of the copy holder to the end that the image formed at the copy holder is always desirably centered with respect to the copy holder.

For further details of the invention, reference may be made to the drawings wherein Fig. 1 is a front view in elevation of a projection printer or enlarger according to the present invention, on line 1—1 of Fig. 2.

Figure 2:
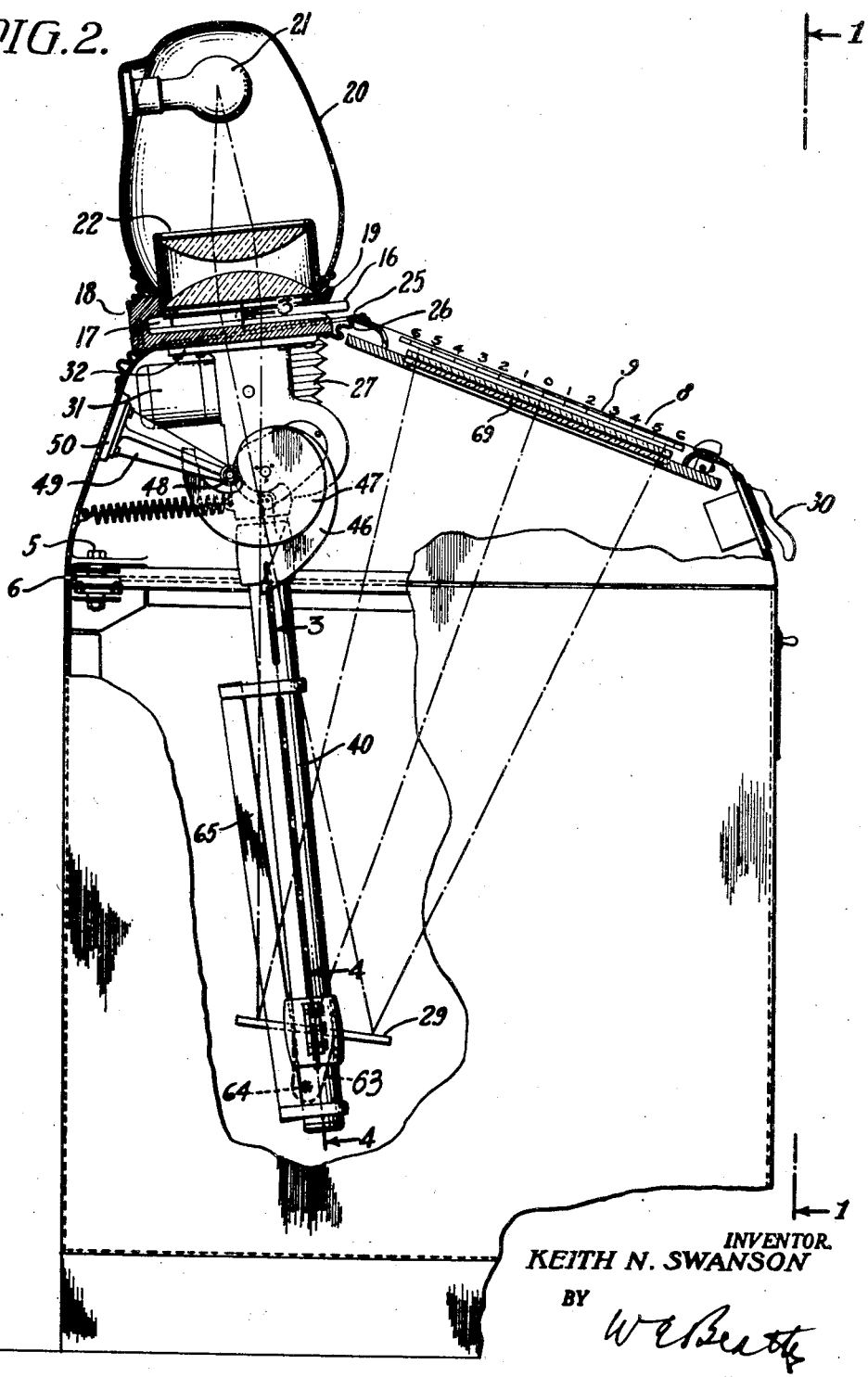
Fig. 2 is a vertical sectional view through the enlarger of Fig. 1.
Figure 4:
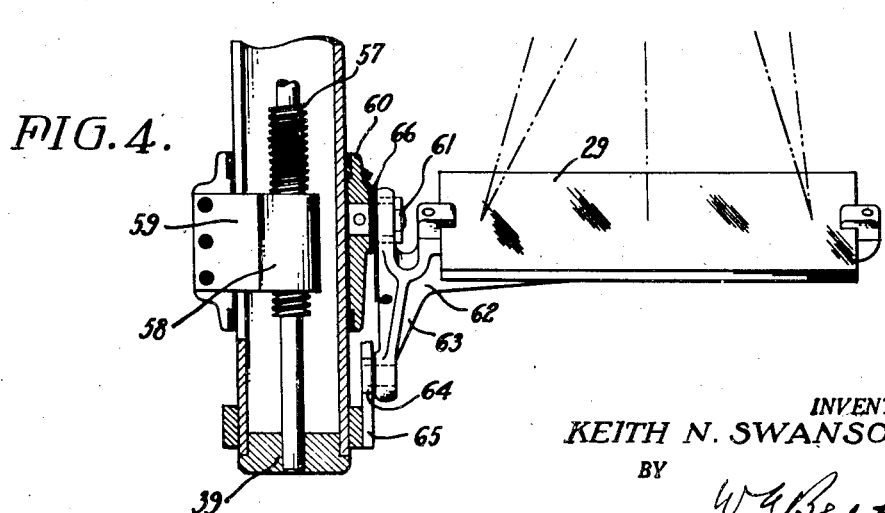

Fig. 4 is an enlarged sectional view on line 4—4 of Fig. 2, lines 3—3 and 4—4 being in alignment.

Fig. 5 is an enlarged side view in elevation of the cam mechanism of Fig. 2.

Fig. 6 is a sectional view on broken line 6—6 of Fig. 5.

Fig. 7 is a sectional view on line 7—7 of Fig. 5.

Referring in detail to the drawings, the projection printer or enlarger 1 of this invention comprises a casing 2 having a lower portion 3 having a door 4 for access to the image beam reflected from mirror 29 for local dodging control. The casing portion 3 has a top 4 suitably secured thereto by means such as bolts 5 and a light seal 6. The bolts 5 are preferably in the nature of a shock absorbing mounting such as the Lord rubber mount, whereby all of the actuating and control mechanism and optical parts are protected against shock, all of such parts being mounted on or carried with the top 4. The top 4 has a slant front 7 in which is arranged the copy holder 8 as shown in Fig. 2. The copy holder 8 may be provided with a suitable scale 9 and with suitable masks, not shown, in order to block out the unwanted part of the enlarged projected picture. Over the copy holder 8 is provided a suitable door 10 having a lock 11 and a number of hinged sections 12, 13. The copyholder 8 has a glass plate 69 on which is placed the sensitized paper. Such paper is held flat by the door 10 which preferably also serves to hold the image, which can be viewed to select the image area to be printed, by reason of the fact that door 10 is frosted on its under surface, and is otherwise transparent. Door 10 may be of plastic material and is preferably orange red in color to prevent the transmission of light which would expose other light sensitive material adjoining the apparatus.

On top of the casing top 4 is arranged spaced pivotal supports 14, 15 to provide a pivotal axis substantially in the plane of the master holder 16. The master holder 16 is removably held in a slot 17 in bracket 18, by means of a spring loaded plate 19. Bracket 18 carries a hood 20 having a frosted projection lamp 21 which serves as a light source for the condenser lens assembly 22 which floods the copy holder 16 with light. Bracket 18 has a pair of pivot pins 23 and 24 pivotally supported by the bearings 14 and 15.

Bracket 18 projects through an opening 25 in the casing top 4 and between the opening 25 and bracket 18 is arranged a flexible light seal 26.

Figure 3:
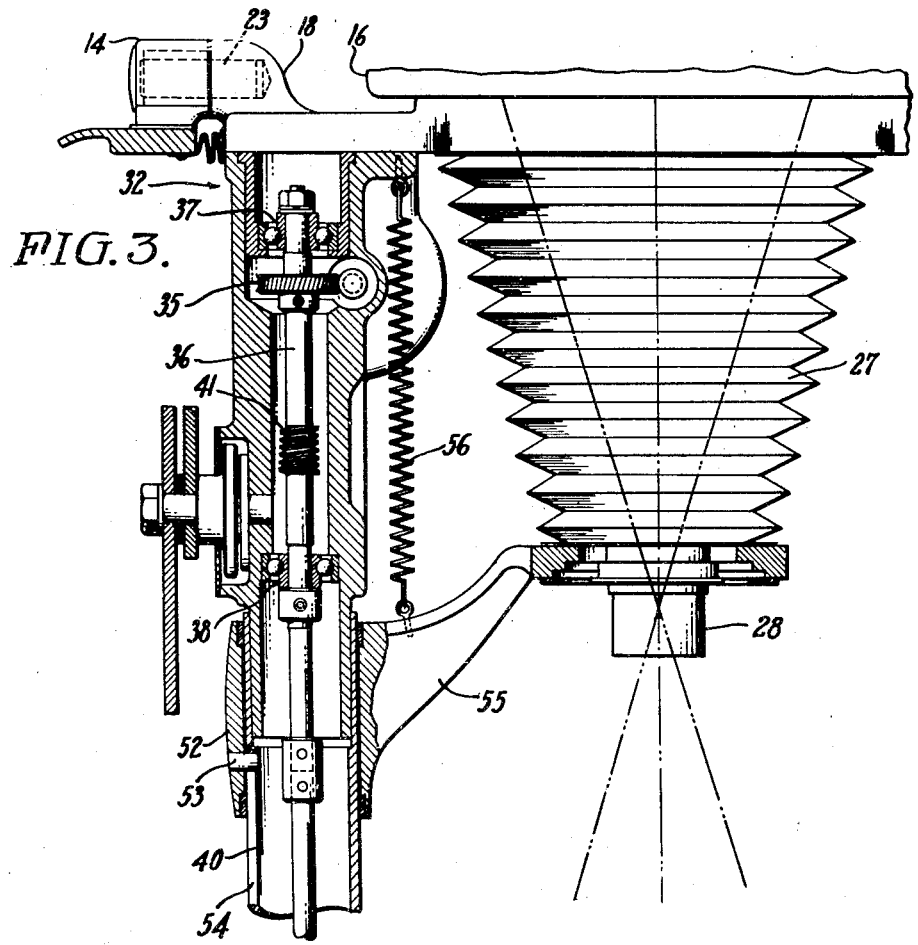
Fig. 3 is an enlarged sectional view, with parts broken away, on line 3—3 of Fig. 2.

Below the master holder 16 is arranged a bellows 27 and a suitable projection lens 28 shown in Fig. 3. The optical path proceeds from the lamp 21 inwardly of the casing to a point inside thereof where the optical path is diverted in a direction outwardly of the casing by a front surface mirror 29, the plate or film in the master holder 16 being focused for all positions of adjustment by lens 28 on the copy holder 8, along an optical path which includes the mirror 29.

Various ratios of enlargement are obtained by adjusting the position of the projection lens 28 and concurrently adjusting the length of the optical path to and from the mirror 29, these adjustments being made in timed relation with each other under control of a controller 30 which may be operated to increase or decrease the ratio of enlargement. The controller 30 is arranged on the top 4 adjacent the copy holder 8, and the latter is adjacent the master holder 16, whereby all three of these elements are at the same operator's position. In other words, the operator may remain in one position and insert or remove plate or film from both holders 8 and 16 as well as select the desired enlargement by operating the controller 30. Over a well-known circuit not shown, the controller 30 may be operated to different positions to operate motor 31 in Fig. 2, in one direction or the other. Motor 31 is carried by a tubular bracket 32 suitably secured to the bracket 18. Motor 31 as shown in Fig. 7, has a shaft 33 having a worm 34 coupled to a worm wheel 35 on a rotatable shaft 36. As shown in Fig. 3, shaft 36 has a suitable bearing 37 at its upper end, an intermediate bearing 38 and a bearing 39 at its lower end. Bearings 37 and 38 are mounted in the tubular bracket 32 and suitably secured with this bracket and extending therefrom in coaxial relation with these bearings is a tubular extension 40 in the lower end of which the bearing 39 is secured.

As shown in Fig. 6, shaft 36 carries a worm 41 which meshes with a worm wheel 42 on shaft 43 having gear 44 which meshes with gear 45 coupled to coaxial angularly fixed radial cams 46 and 47.

As shown in Fig. 2, cam 47 cooperates with a cam roller 48 held by a bracket 49 secured to casing 4 as indicated at 50. Cam 47 is arranged in one plane and has a varying radius, whereby when cam 47 is rotated by motor 31 it cooperates with roller 48 which is on a fixed axis, to tilt about the tilt axis 14, 15 all of the apparatus connected with the bracket 18, including the hood 20, condenser lens 22, master holder 16, bellows 27, lens 28 and mirror 29.

Cam 46 rotates with cam 47 when motor 31 is operated and cooperating with cam 46 as shown in Figs. 2 and 5 is a roller 51 carried at the upper end of a sleeve 52 having a pin 53 sliding in a slot 54 in tube 40. Sleeve 52 carries a bracket 55 which supports the lens 28 as shown in Fig. 3. Bracket 55 is held in its uppermost position, with roller 51 against cam 46 by a tension spring 56.

The rotation of cam 46 serves to move the projection lens 28 to different positions to obtain various ratios of enlargement and for any given focusing adjustment of lens 28 a proper length of the optical path through mirror 29 is obtained by imparting two movements to the mirror 29, namely a movement lengthwise of tube 40 to obtain the proper optical length of the optical path and a tilt movement to align the projected picture with the copy holder 8. Lengthwise movement of the mirror is obtained by means of a worm 57 on shaft 36, this worm driving a nut 58 carried by a flat flange 59 which rides in slot 54, flange 59 being secured to a sleeve 60 having a pivotal support 61 for a bracket 62 on which mirror 29 is mounted. Bracket 62 has an extension 63 carrying a cam follower 64 which is held against a linear cam 65, fixed on and extending longitudinally of the extension 40, by a spring 66 to effect tilting movement of the mirror. The lower end of cam 65 is shown in Fig. 4 and a full side view thereof is shown in Fig. 2. Cam 65 extends at a slight angle to the axis of the tilting tubular extension 40 as it is only necessary to tilt mirror 29 through half of the angle that tube 40 tilts with respect to the casing 2.

As will be observed, the master holder 16, the copy holder 8 and the mirror 29 are so arranged that the mirror forms a folded optical path between the master and copy holders, and the projection lens 28 is disposed between the master holder and mirror for projecting light from the master holder to the mirror and thence to the copy holder for forming an image at the copy holder plane. The bracket 18, the bracket 32 and the tubular extension 40, constitute a support extending longitudinally of the portion of the optical path between the master holder and mirror, and this support is mounted for pivotal adjustment, by means of the pivot pins 23 and 24 pivotally supported by the bearings 14 and 15, on an axis normal to the plane of the folded portions of the optical path and disposed in the region of the master holder and preferably at the plane thereof. The master holder is mounted on the support for pivotal adjustment therewith on this axis, and the mirror and the projection lens are mounted on the support for pivotal adjustment therewith on this axis and are mounted on this support for independent adjustment longitudinally of said optical path portion, the mirror being thus mounted for adjustment longitudinally of both optical path portions, and the mirror is mounted for pivotal adjustment, by means of the pivotal support 61 between the mirror bracket 62 and the sleeve 60, on a second axis normal to the plane of said optical path portions and disposed in the region of and preferably at the plane of the mirror.

The shaft 36 is rotatably mounted on the support, comprising the bracket 18, the bracket 32 and the tubular extension 40, and extends between the mirror and projection lens longitudinally of the optical path portion between the master holder and the mirror, the nut 58 is screwthreaded on the shaft 36 in the region of the mirror and is operative to effect adjustment of the mirror longitudinally of the optical path portion between the master holder and mirror with rotation of this shaft, and the linear cam 65 is fixed with and extends longitudinally of this support and is operative to effect adjustment of the mirror on the aforesaid second axis. The coaxial angularly fixed radial cams 46 and 47 are rotatably mounted on the support on an axis transverse to the shaft 36 and are disposed in the region of the projection lens and are operative respectively to effect adjustment of the projection lens longitudinally of the optical path portion between the master holder and mirror and adjustment of the support on said first mentioned axis with rotation thereof, and the reduction gearing, comprising the worm 41, the worm wheel 42 on the shaft 43, the gear 44 on the shaft 43, and the gear 45, is operative to drive the cams 46 and 47 at a reduced velocity from the shaft 36.

Thus is provided a desirable and compact adjusting means operative conjointly on the mirror, the projection lens and the support carrying the master holder, the projection lens and mirror to simultaneously effect the aforesaid adjustments thereof at predeterminately proportioned velocities maintaining conjugate foci of the projection lens at the planes of the master and copy holders and maintaining the axis of the optical path portion between the mirror and copy holder fixed at the plane of the copy holder.

Figure 1:
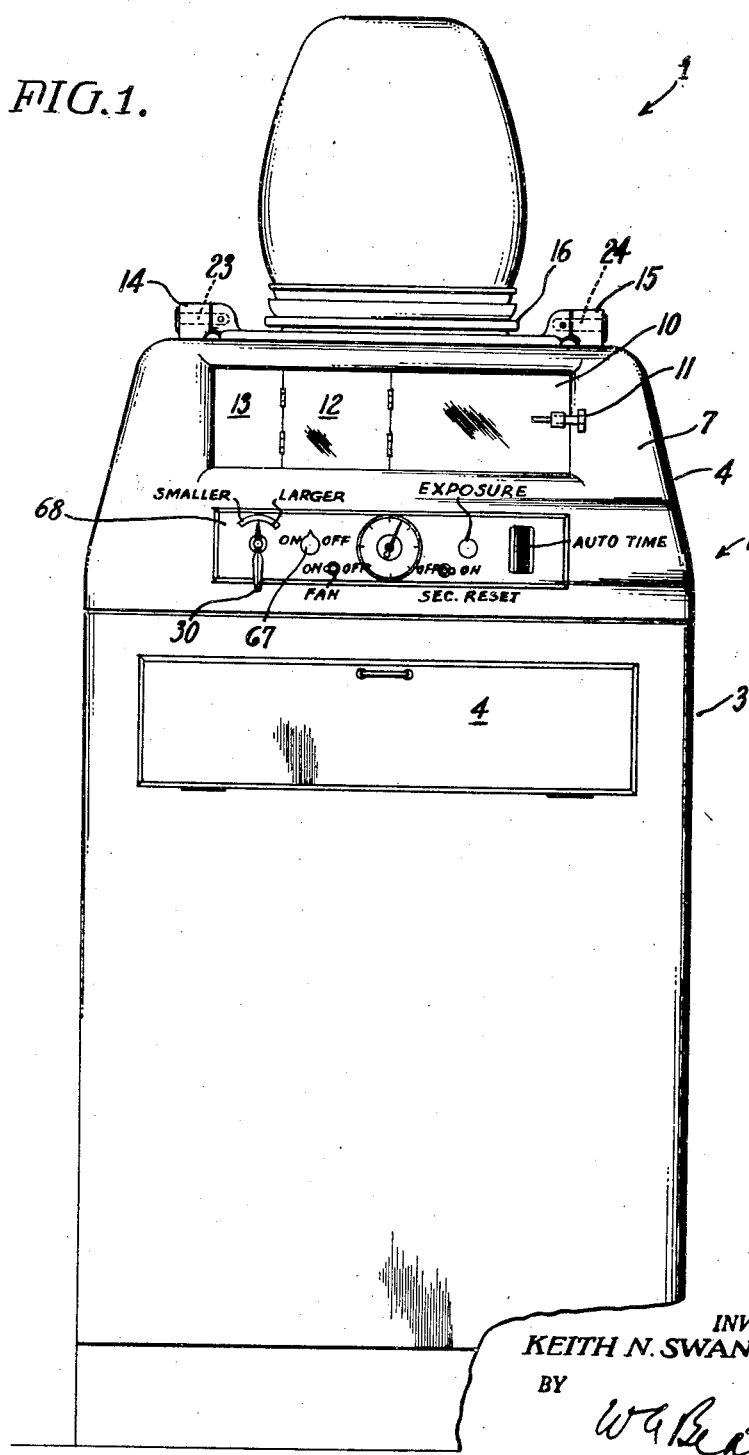

As shown in Fig. 1, the motor direction handle 30, the motor on and off switch 67 and any desired auxiliary equipment may be arranged on a panel 68 on the casing top 4 adjacent the cover 10 for the copy holder 8.

When the motor 31 is set into operation, the ratio of enlargement is either increased or decreased as desired, while maintaining the plate or film in the master holder 16, in focus on the sensitized film or paper in the copy holder 8 and this is brought about by a number of concurrent and optically related operations such as tilt movement of all the actuating parts and all the optical parts, except copy holder 8 about tilt axis 14, 15, focusing adjustment of lens 28 lengthwise of tilt support 40, adjustment of mirror 29 lengthwise of tilt support 40 and tilt adjustment of mirror 29 on tilt support 40.

It will be apparent that various modifications may be made in the invention without departing from the spirit of the following claims.

I claim:

1. In a photographic enlarger, the combination of a master holder, a copy holder and a mirror so arranged that said mirror forms a folded optical path between said master and copy holders and said mirror being mounted for adjustment longitudinally of the folded portions of said optical path, a projection lens disposed between said master holder and mirror for projecting light from said master holder to said mirror and mounted for adjustment along the portion of said light path between said master holder and mirror, and adjusting means conjointly operative on said mirror and lens to simultaneously effect said adjustments thereof at predeterminately portioned velocities maintaining conjugate foci of said lens at the planes of said master and copy holders.

2. In a photographic enlarger, the combination of a master holder, a copy holder and a mirror so arranged that said mirror forms a folded optical path between said master and copy holders and said mirror being mounted for adjustment longitudinally of the folded portions of said optical path, a projection lens disposed between said master holder and mirror for projecting light from said master holder to said mirror and mounted for adjustment longitudinally of the portion of said optical path between said master holder and mirror, and adjusting means conjointly operative on said mirror and lens to simultaneously effect said adjustments thereof at predeterminately proportioned velocities maintaining conjugate foci of said lens at the planes of said master and copy holders and comprising a rotatable shaft extending between said mirror and lens, adjusting means on the region of said mirror and operative to effect said mirror adjustment with rotation of said shaft, and a second adjusting means in the region of said lens and operative to effect said lens adjustment with rotation of said shaft.

3. In a photographic enlarger, the combination of a master holder, a copyholder and a mirror so arranged that said mirror forms a folded optical path between said master and copy holders and said mirror being mounted for adjustment longitudinally of the folded portions of said optical path, a projection lens disposed between said master holder and mirror for projecting light from said master holder to said mirror and mounted for adjustment longitudinally of the portion of said optical path between said master holder and mirror, and adjusting means conjointly operative on said mirror and lens to simultaneously effect said adjustments thereof at predeterminately proportioned velocities maintaining conjugate foci of said lens at the planes of said master and copy holders and comprising a rotatable shaft extending between said mirror and lens, a nut screwthreaded on said shaft in the region of said mirror and operative to effect said mirror adjustment with rotation of said shaft, and a rotatable cam in the region of said lens and angularly fixed with said shaft and operative to effect said lens adjustment with rotation of said shaft.

4. In a photographic enlarger, the combination of a master holder, a copy holder and a mirror so arranged that said mirror forms a folded optical path between said master and copy holders, a projection lens disposed between said master holder and mirror for projecting light from said master holder to said mirror, a support extending longitudinally of the portion of said optical path between said master holder and mirror and upon which said mirror and lens are mounted for independent adjustment longitudinally of said optical path portion, and adjusting means conjointly operative on said mirror and lens to simultaneously effect said adjustments thereof at predeterminately proportioned velocities maintaining conjugate foci of said lens at the planes of said master and copy holders and comprising a shaft rotatably mounted on said support and extending longitudinally of said optical path portion, a nut screwthreaded on said shaft in the region of said mirror and operative to effect said mirror adjustment with rotation of said shaft, a radial cam rotatably mounted on said support on an axis transverse to said shaft and disposed in the region of said lens and operative to effect said lens adjustment with rotation thereof, and reduction gearing operative to drive said cam at reduced velocity from said shaft.

5. In a photographic enlarger, the combination of a master holder, a copy holder and a mirror so arranged that said mirror forms a folded optical path between the master and copy holders, a projection lens disposed between said master holder and mirror for projecting light from said master holder to said mirror, said master holder, said lens and said mirror being mounted for pivotal adjustment on an axis normal to the plane of the folded portions of said optical path and disposed in the region of the plane of said master holder and said mirror and lens being mounted for independent adjustment longitudinally of the portion of said optical path between said master holder and mirror and said mirror being mounted for pivotal adjustment on a second axis normal to the plane of said optical path portions and disposed in the region of the plane of said mirror, and adjusting means operative conjointly on said master holder, mirror and lens to simultaneously effect said adjustments thereof at predeterminately proportioned velocities maintaining conjugate foci of said lens at the planes of said master and copy holders and maintaining the axis of the light path portion between said mirror and copy holder fixed at the plane of said copy holder.

6. In a photographic enlarger, the combination of a master holder, a copy holder and a mirror so arranged that said mirror forms a folded optical path between said master and copy holders, a projection lens disposed between said master holder and mirror for projecting light from said master holder to said mirror, a support extending longitudinally of the portion of said optical path between said master holder and mirror and mounted for pivotal adjustment on an axis normal to the plane of the folded portions of said optical path and disposed in the region of the plane of said master holder, said master holder being mounted on said support for pivotal adjustment therewith on said axis and said mirror and lens being mounted on said support for pivotal adjustment therewith on said axis and for independent adjustment longitudinally of said optical path portion and said mirror being mounted for pivotal adjustment on a second axis normal to the plane of said optical path portions and disposed in the region of the plane of said mirror, and adjusting means operative conjointly on said mirror, lens and support to simultaneously effect said adjustments thereof at predeterminately proportioned velocities maintaining conjugate foci of said lens at the planes of said master and copy holders and maintaining the axis of the optical path portion between said mirror and copy holder fixed at the plane of said copy holder.

7. In a photographic enlarger, the combination of a master holder, a copy holder and a mirror so arranged that said mirror forms a folded optical path between said master and copy holders, a projection lens disposed between said master holder and mirror for projecting light from said master holder to said mirror, a support extending longitudinally of the portion of said optical path between said master holder and mirror and mounted for pivotal adjustment on an axis normal to the plane of the folded portions of said optical path and disposed in the region of said master holder, said master holder being mounted on said support for pivotal adjustment therewith on said axis, and said mirror and lens being mounted on said support for pivotal adjustment therewith on said axis and for independent adjustment longitudinally of said optical path portion and said mirror being mounted for pivotal adjustment on a second axis normal to the plane of said optical path portions and disposed in the region of the plane of said mirror, and adjusting means operative conjointly on said mirror, lens and support to simultaneously effect said adjustments thereof at predeterminately proportioned velocities maintaining conjugate foci of said lens at the planes of said master and copy holders and maintaining the axis of the optical path portion between said mirror and copy holder fixed at the plane of said copy holder and comprising a shaft rotatably mounted on said support and extending longitudinally of said first mentioned optical path portion, adjusting means in the region of said mirror and operative to effect adjustment of said mirror longitudinally of said first mentioned optical path portion with rotation of said shaft, a second adjusting means operative between said support and mirror to effect adjustment of said mirror on said second axis with adjustment of said mirror longitudinally of said first mentioned optical path portion, and third and fourth adjusting means in the region of said lens and operative respectively to effect the adjustment of said lens longitudinally of said first mentioned optical path portion and adjustment of said support on said first mentioned axis with rotation of said shaft.

8. In a photographic enlarger, the combination of a master holder, a copy holder and a mirror so arranged that said mirror forms a folded optical path between said master and copy holders, a projection lens disposed between said master holder and mirror for projecting light from said master holder to said mirror, a support extending longitudinally of the portion of said optical path between said master holder and mirror and mounted for pivotal adjustment on an axis normal to the plane of the folded portions of said optical path and disposed in the region of said master holder, said master holder being mounted on said support for pivotal adjustment therewith on said axis and said mirror and lens being mounted on said support for pivotal adjustment therewith on said axis and for independent adjustment longitudinally of said optical path portions and said mirror being mounted for pivotal adjustment on a second axis normal to the plane of said optical path portions and disposed in the region of the plane of said mirror, and adjusting means operative conjointly on said mirror, lens and support to simultaneously effect said adjustments thereof at predeterminately proportioned velocities maintaining conjugate foci of said lens at the planes of said master and copy holders and maintaining the axis of the optical path portion between said mirror and copy holder fixed at the plane of said copy holder and comprising a shaft rotatably mounted on said support and extending longitudinally of said optical path portion, a nut screwthreaded on said shaft in the region of said mirror and operative to effect adjustment of said mirror longitudinally of said first mentioned optical path portion with rotation of said shaft, a linear cam fixed with and extending longitudinally of said support and operative to effect adjustment of said mirror on said second axis, two coaxial angularly fixed radial cams rotatably mounted on said support on an axis transverse to said shaft and disposed in the region of said lens and operative respectively to effect adjustment of said lens longitudinally of said first mentioned optical path portion and adjustment of said support on said first mentioned axis with rotation thereof, and reduction gearing operative to drive said radial cams at reduced velocity from said shaft.

KEITH N. SWANSON.

REFERENCES CITED

The following references are of record in the file of this patent:

UNITED STATES PATENTS

| Number | Name | Date |
|---|---|---|
| 2,133,978 | Draeger | Oct. 25, 1938 |
| 2,137,028 | | |
| 2,141,176 | | |
| 2,163,776 | | |
| 2,303,518 | | |
| 2,319,882 | | |
| | Rau | Nov. 15, 1938 |
| | Draeger | Dec. 27, 1938 |
| | Current et al. | June 27, 1939 |
| | White | Dec. 1, 1942 |
| | Reagan et al. | May 25, 1943 |

FOREIGN PATENTS

| Number | Country | Date |
|---|---|---|
| 818,632 | France | Sept. 30, 1937 |